(12) United States Patent
Liu

(10) Patent No.: US 6,212,060 B1
(45) Date of Patent: Apr. 3, 2001

(54) MULTI-CAPACITOR DEVICE

(75) Inventor: Zhenyn Lawrence Liu, Pleasanton, CA (US)

(73) Assignee: Krypton Isolation, Inc., Pleasanton, CA (US)

( * ) Notice: Subject to any disclaimer, the term of this patent is extended or adjusted under 35 U.S.C. 154(b) by 0 days.

(21) Appl. No.: 09/282,316

(22) Filed: Mar. 31, 1999

(51) Int. Cl.[7] .............. H01G 4/38; H01G 4/30; H01G 4/06
(52) U.S. Cl. .......... 361/329; 361/301.4; 361/313
(58) Field of Search ............. 361/301.1, 301.4, 361/303, 306.1, 307, 308, 309, 311, 312, 313, 320, 321.1, 321.2, 321.3, 321.4, 321.5, 328, 324, 330

(56) References Cited

U.S. PATENT DOCUMENTS

| | | | |
|---|---|---|---|
| 4,567,542 | * | 1/1986 | Shimada et al. ............ 361/321.2 |
| 4,831,494 | * | 5/1989 | Arnold et al. ................ 361/306 |
| 4,864,465 | * | 9/1989 | Robbins ..................... 361/321.4 |
| 5,065,275 | * | 11/1991 | Fujisaki et al. ............. 361/321.4 |
| 5,144,526 | * | 9/1992 | Vu et al. .................... 361/321.1 |
| 5,583,738 | * | 12/1996 | Kohno et al. ................ 361/312 |
| 5,599,414 | * | 2/1997 | Roethlingshoefer ............ 156/89 |
| 5,757,611 | * | 5/1998 | Gurkvich et al. ............ 361/321.4 |
| 5,800,575 | * | 9/1998 | Lucas et al. .................. 29/830 |
| 5,870,274 | * | 2/1999 | Lucas et al. ................. 361/312 |

* cited by examiner

*Primary Examiner*—Anthony Dinkins
*Assistant Examiner*—Eric Thomas
(74) *Attorney, Agent, or Firm*—Harris Zimmerman

(57) ABSTRACT

A multi-capacitor device having a plurality of capacitors in a single circuit package is formed of a plurality of layers of dielectric material, preferably the same type of material that is commonly used to fabricate circuit boards. The plurality of layers are disposed in a vertically stacked relationship. Each capacitor is formed of first and second pluralities of planar electrodes formed on alternating layers of the stack. The first plurality of electrodes is disposed in a first vertically stacked array, and the second plurality of electrodes is disposed in a second vertically stacked array. Each vertical electrode array is provided with a via hole extending through all of its layers to connect all of the respective electrode array in parallel. At the upper surface of the assembly, each via hole is connected to a solder pad and disposed to be soldered to a connection point on a printed circuit board or the like. The assembly may be fabricated using standard techniques for manufacturing multilayer printed circuit boards. A large number of capacitors may be created on a single large format planar array, and then cut into individual packages having one or more capacitors in side-by-side relationship. Two or more layers of circuit board material may be deposited between the vertically stacked electrodes, to increase the breakdown voltage of the capacitors.

4 Claims, 3 Drawing Sheets

MULTI-CAPACITOR DEVICE

BACKGROUND OF THE INVENTION

The present invention relates to capacitors, and, more particularly, to multiple capacitors for use in conjunction with printed circuit boards and the like.

The introduction and development of integrated circuit technology has created the capacity to fabricate an extraordinarily large number of active electronic elements on a single circuit die. Such circuits provide functionality to a depth and extent that appeared to be fantastic only a few years ago. One result of these developments has been the miniaturization of electronic devices that were formerly large and bulky, by using integrated circuit packages mounted on printed circuit boards with the necessary ancillary devices.

Many electronic devices require some reactive elements to carry out their designed functions. Due to the fact that inductors are generally larger and noisier that capacitors, circuit board designers have tended to eliminate inductors in favor of capacitors to provide the required reactance. Capacitors have also been miniaturized as much as possible to reduce the area they occupy on a printed circuit board. Capacitors are typically provided as discrete components that are mounted on a circuit board by soldering or other techniques known in the prior art. However, there are physical limitations that constrain the miniaturization process, such as the need for high breakdown voltage, which demands a minimal thickness of a high dielectric material Likewise, the capacitive effect is based on separated charge planes, and there are limits to the ways in which the charged conductors can be folded or compacted into a small package. As a result of these limitations, a single capacitor on a circuit board may occupy a substantial fraction of the area required for an integrated circuit package that may contain thousands of active elements. Recognizing that circuit board area is related directly to the cost of the board, there is an ongoing need to further reduce the size of capacitors to the greatest extent, while still providing the requisite capacitive value and operating voltage.

In U.S. Pat. No. 5,500,895, issued to Gerald Yurgelites, there is described a method and apparatus for transmitting communications signals across an electrical isolation barrier. One example of this invention is the transmission of telecommunications signals across the isolation barrier that is required between a telephone network and any telephonic device (telephone, facsimile machine, modem, and the like). This invention employs paired capacitors connected across the isolation barrier, and differentially charges the paired capacitors to deliver the signal across the barrier without breaching the isolation that the barrier provides. Although the electronic circuits required for this purpose have been rendered in integrated circuits that require very little circuit board area, it has been found that the capacitors of the invention require a substantial fraction of the area of the integrated circuits. It would be advantageous to reduce the area that these capacitors occupy. Likewise, there are many other situations in which further miniaturization of capacitors mounted on a circuit board would be beneficial.

Further, there are many electronic circuits that require capacitors that are paired and matched in capacitive value for proper signal handling and the like. Obtaining matched pairs of capacitors typically involves an additional cost above and beyond the cost involved in obtaining two capacitors that are within a common specification but not closely matched. It would be desirable to be able to obtain matched capacitors without having to pay a premium price.

SUMMARY OF THE INVENTION

The present invention generally comprises a multi-capacitor device that provides a plurality of capacitors in a single circuit package that occupies a very small area. The device also provides capacitors that have very high operating voltages, and the capacitors are inherently highly similar in electrical characteristics for matched or paired circuit demands.

The multi-capacitor device is comprised of a plurality of layers of dielectric material, preferably the same type of material that is commonly used to fabricate circuit boards. One example of this material is fiberglass impregnated resin material, such as FR 4, or the like. The plurality of layers are disposed in a vertically stacked, interleaved, alternating relationship. Each capacitor is comprised of first and second pluralities of planar electrodes formed on alternating layers of the stack. The first plurality of electrodes is disposed in a first vertically stacked array, and the second plurality of electrodes is disposed in a second vertically stacked array. The two vertical arrays are laterally offset to a slight extent, whereby the arrays overlap to a great extent. Each vertical electrode array is provided with a via hole extending through all of the layers in a non-overlapped portion of the array. The via hole is plated to connect all of the respective electrode array in parallel. At the upper surface of the assembly, each via hole is surrounded by a solder pad connected to the via hole plating and disposed to be soldered to a connection point on a printed circuit board or the like.

A singular advantage of the capacitor device of the invention is that it may be fabricated using standard printed circuit board manufacturing techniques. Each layer of dielectric material may be printed by prior art lithographic or other well known techniques, and the layers may be assembled using processes that are common to the electronics industry. Moreover, a large number of capacitors may be created on a single large format planar array, the capacitors being closely spaced in adjacent relationship. After all the manufacturing steps are completed, the large format planar array may be cut into individual packages having as many capacitors as desired in side-by-side relationship.

The multi-capacitor device of the invention also provides high operating voltage, due to the inherently high breakdown voltage of the circuit board material that forms the layers of the device. If it is desirable to increase the operating voltage of the multi-capacitor device, two or more layers of circuit board material may be deposited between the vertically stacked electrodes, whereby the maximum operating voltage is increased by integer multiples of the breakdown voltage of each layer.

Moreover, the printed circuit processes used to fabricate the multi-capacitor device offer highly predictable, highly reproducible outcomes. As a result, the capacitors are very closely matched in electrical characteristics, and can be used effectively in situations where paired, matched capacitors are required.

A further advantage of the invention is that the multi-capacitor device provides a plurality of capacitors in a very small package. As one example, a package of 6 capacitors having a breakdown voltage of 5000 VDC and capacitive value in the range of 10–20 pF has a thickness less than one millimeter and rectangular profile dimensions that are less than 8 mm by 12 mm. An equivalent number of discrete component capacitors would occupy a far larger area on a circuit board. Therefore, the invention provides substantial savings in circuit board "real estate", with the concomitant savings in board cost and reduction in product size.

DESCRIPTION OF THE PREFERRED EMBODIMENT

Figure 2:
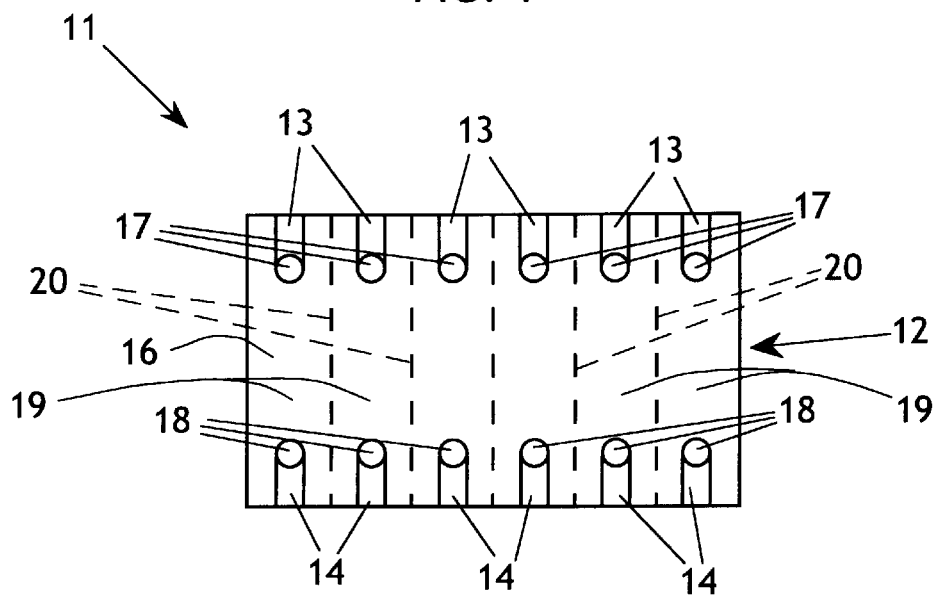
FIG. 2 is a plan view of the multi-capacitor device of the invention as shown in Figure .
Figure 5:
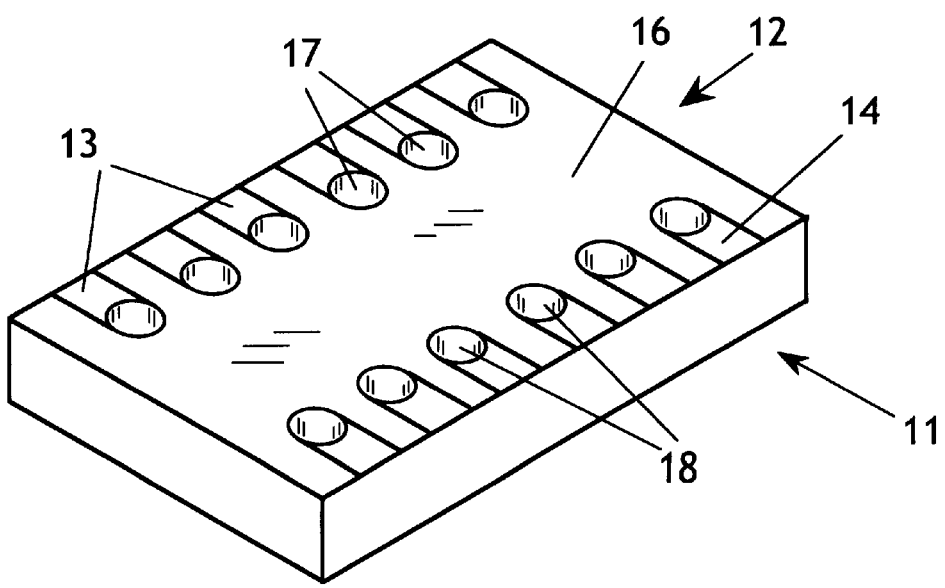
FIG. 5 is a perspective top view of the multi-capacitor device of the invention as shown in the preceding figures.

The present invention generally comprises a multi-capacitor device that provides a plurality of capacitors in a single circuit package that occupies a very small area. With regard to FIGS. 2, 3, and 5, the multi-capacitor device 11 is comprised of a generally rectangular assembly 12 having a plurality of solder pads 13 and 14 arrayed on opposed respective side portions of the top surface 16 of the assembly 12. A plurality of via holes 17 and 18 extend through the top surface and through the entire assembly 12, each of the holes 17 and 18 being disposed in electrical contact with one of the respective solder pads 13 and 14. Each capacitor 19 has electrical connections comprised of one of the solder pads 13 and the respective laterally opposed solder pad 14. Thus, in the assembly 12 depicted in the figures, there are six capacitors formed in longitudinally spaced, closely adjacent fashion, each separated by lateral boundary lines 20. The bottom surface of the assembly 12 may include like solder pads 13 and 14 in electrical contact with the respective via holes 17 and 18.

The assembly 12 is comprised of a plurality of layers 21 of dielectric material, such as the materials and substances that are commonly employed to fabricate printed circuit boards. One example of this material is fiberglass impregnated resin, such as FR 4, although any polymer, resin, or solid substance known to be used in the manufacture of printed circuit boards may be employed, and the use of reinforcing fiber is elective. The layers 21 are disposed in vertically stacked relationship, the vertical direction corresponding to the thickness dimension of the assembly 12. For ease of construction the layers 21 may all have the same uniform thickness.

Figure 1:
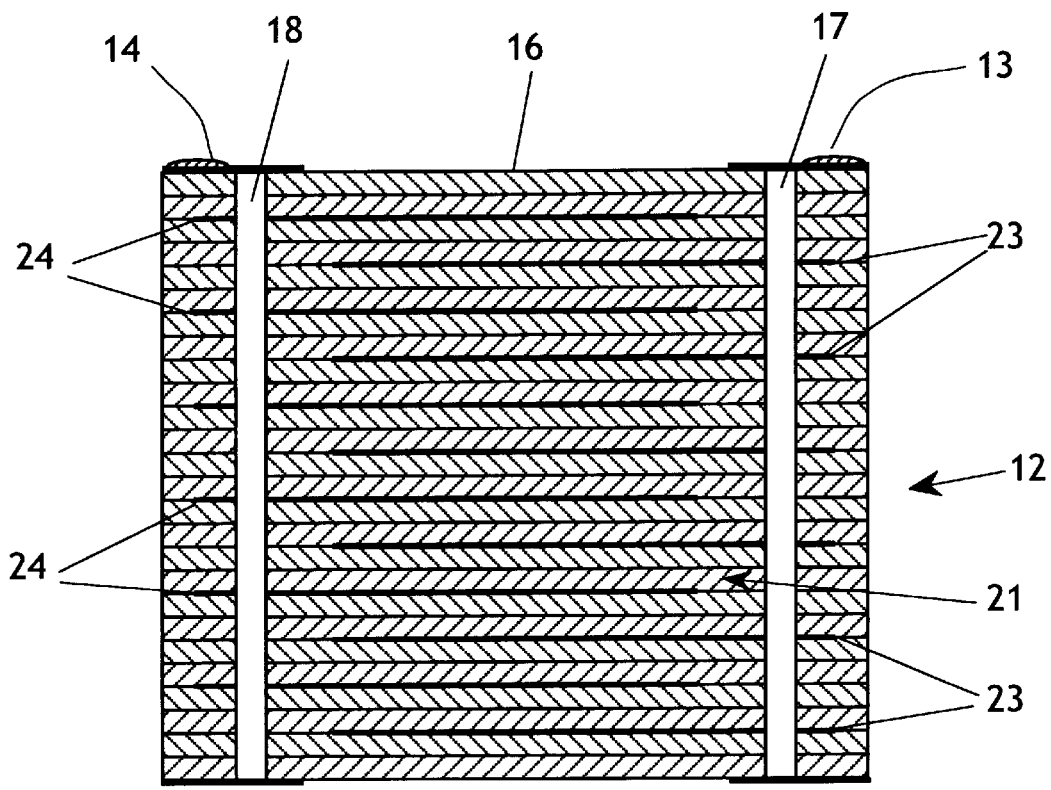
FIG. 1 is a cross-sectional elevation of the multi-capacitor device of the present invention.
Figure 3A:
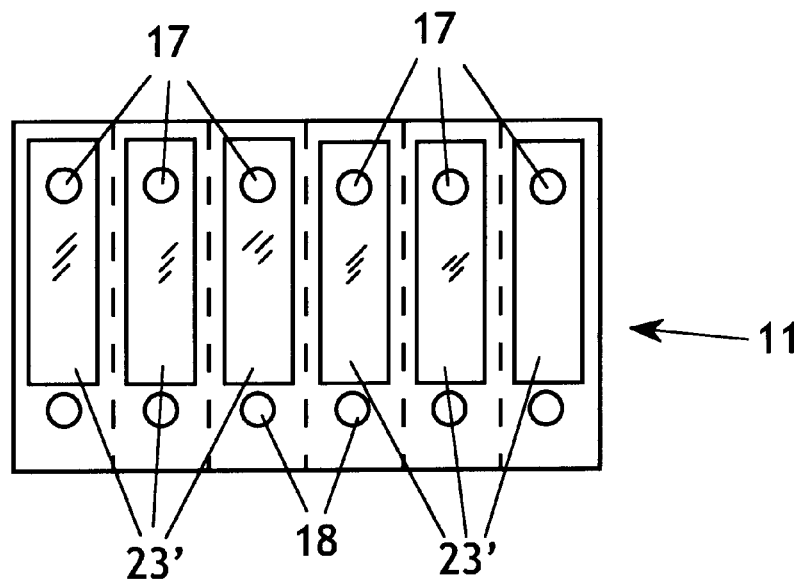
FIGS. 3A and 3B are plan views showing layout of conductors of individual layers of the multi-capacitor device of the invention as shown in FIGS. 1 and 2.
Figure 3B:
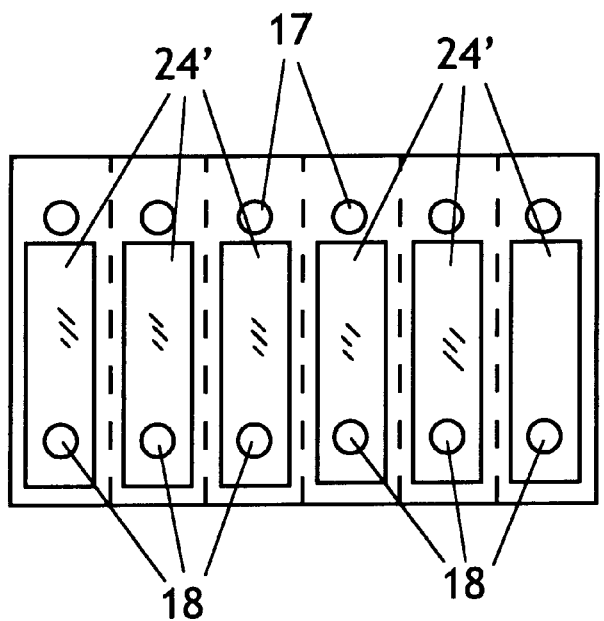
Figure 4:
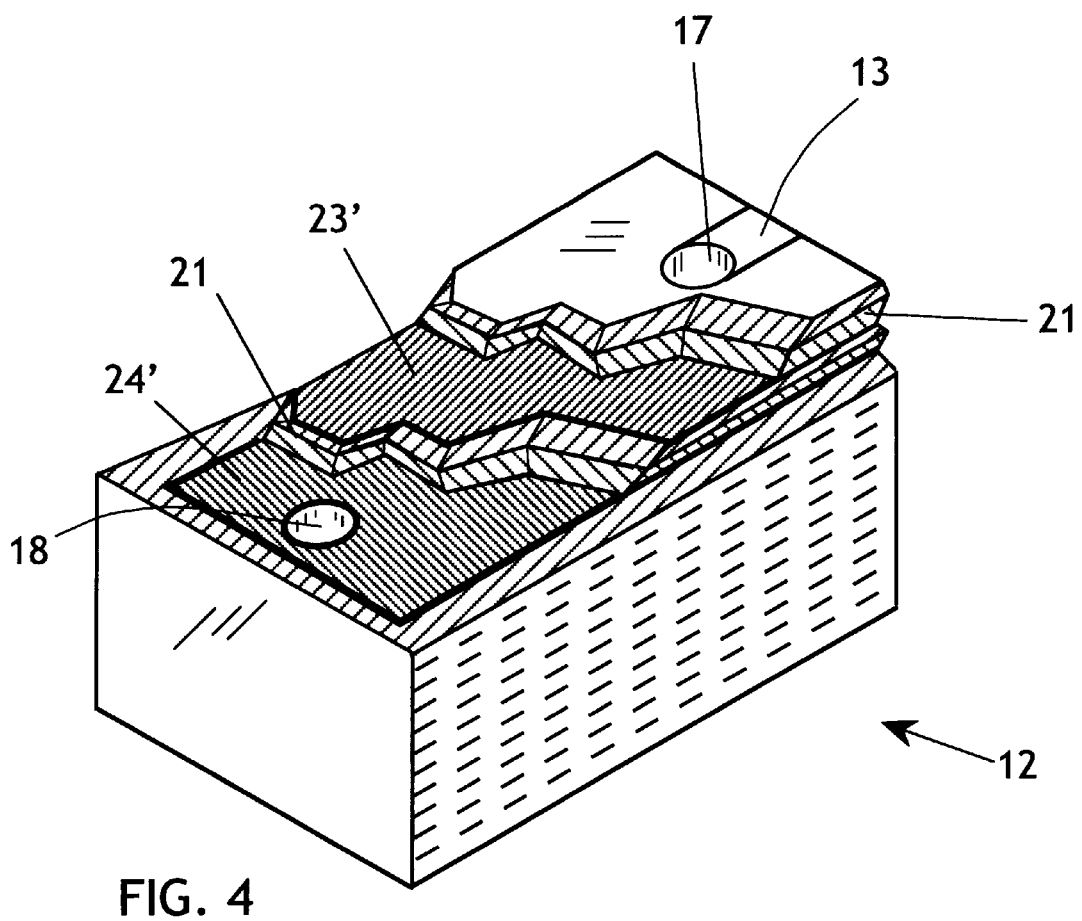
FIG. 4 is a partially cutaway perspective view of the multi-capacitor device of the invention as shown in FIGS. 1–3.

With particular regard to FIGS. 1, 3 and 4, a first plurality of planar electrodes 23 are formed on alternating layers 21 in a vertically stacked array that is laterally offset toward the via holes 13. As shown in FIG. 3A, on each layer 21 having the electrodes 23, the electrodes comprise an array of rectangular conductors 23' separated from each other and from the via holes 18. Each of the via holes 17 extend through the electrodes 23' and electrically connect all the electrodes 23' in a respective vertical stack in electrical parallel fashion. Likewise, a second plurality of planar electrodes 24 are formed on alternating layers 21 in a vertically stacked array that is laterally offset toward the via holes 14. As shown in FIG. 3B, on each layer 21 having the electrodes 24, the electrodes comprise an array of rectangular conductors 24' separated from each other and from the via holes 13. Each of the via holes 18 extend through the electrodes 24' and electrically connect all the electrodes 24' in a respective vertical stack in electrical parallel fashion.

The electrodes 23' and 24' of each capacitor comprise conductive plate electrodes that are separated by the dielectric material of the layers 21, creating a capacitive electrical effect. Each pair of laterally adjacent holes 17 and 18 comprise the connections to the respective charged plates, and the solder pads 13 and 14 enable connection of the individual capacitors into a printed circuit board and the like.

It may be appreciated that the breakdown voltage of the capacitors of the assembly 12 is directly related to the dielectric strength and thickness of the layers 21 separating the electrodes 23' and 24' of each capacitor. This voltage may be tailored by selecting the thickness of the layers 21. In addition, plural layers 21 may be placed between adjacent electrodes 23' and 24', as shown in FIG. 1, to multiply the breakdown voltage of the capacitors.

The assembly 12 may be manufactured using the well known techniques for fabricating multi-layer printed circuit boards. Each layer 21 may be laminated to the previous layer to form the vertical stack shown in FIGS. 1 and 4, and the electrodes 23' and 24' may be produced by lithographic circuit printing methods that are highly precise and reproducible. All of the electrodes 23' and 24' can be made very similar in size and thickness, and, as a result, the capacitive values of the capacitors are all within very close tolerances. Consequently, the capacitors of the device 12 may be used in situations calling for matched paired capacitors without requiring individually measuring and matching of discrete components, as is known in the prior art.

A further advantage of the invention is that the multi-capacitor device provides a plurality of capacitors in a very small package. As one example, a package of 6 capacitors having a breakdown voltage of 5000 VDC and capacitive value in the range of 10–20 pF has a thickness less than one millimeter and rectangular profile dimensions that are less than 8 mm by 12 mm. An equivalent number of discrete component capacitors would occupy a far larger area on a circuit board. Therefore, the invention provides substantial savings in circuit board "real estate", with the concomitant savings in board cost and reduction in product size.

It may be appreciated that the process for fabricating the devices 12 may be carried out in a very large format array, whereby a large number of capacitors may be formed in laterally adjacent fashion. The very large array may then be cut into individual dice having the required number of capacitors in each die. Although six capacitors are shown in each assembly 12, the number of capacitors in each assembly 12 may be one or more, in accordance with the requirements of the circuit into which the assembly 12 is connected.

The printed circuit processes for fabricating the assembly 12 enable great economy of scale, so that the assembly 12 may be manufactured and sold for far less than equivalent discrete component capacitors.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A multi-capacitor assembly for electronic circuits, including:
   a first plurality of layers of dielectric material disposed in vertically stacked relationship and having a lateral dimension and a longitudinal dimension;
   each of said first plurality of layers including a first plurality of electrodes disposed in a first longitudinal array;
   a second plurality of layers of dielectric material disposed in vertically stacked relationship and having said lateral and longitudinal dimensions;
   each of said plurality of layers including a second plurality of electrodes disposed in a second longitudinal array;
   said first and second pluralities of layers of dielectric material being disposed in interleaved, alternating fashion;
   said first and second pluralities of layers being formed of material commonly used for multilayer printed circuit board construction, said materials including a resin compound; and,
   means for electrically connecting said first and second pluralities of electrodes to define a plurality of capacitors in longitudinally spaced, closely adjacent disposition.

2. The multi-capacitor assembly of claim 1, wherein said material of said first and second pluralities of layers includes fiberglass impregnated resin compound.

3. A capacitor assembly for electronic circuits, including:
   a first plurality of layers of dielectric material disposed in vertically stacked relationship;
   each of said first plurality of layers including a first plurality of electrodes;
   a second plurality of layers of dielectric material disposed in vertically stacked relationship;
   each of said second plurality of layers including a second plurality of electrodes;
   said first and second pluralities of layers of dielectric material being disposed in interleaved, alternating fashion;
   means for electrically connecting said first and second pluralities of electrodes to respective first and second terminals to define at least one capacitor; and,
   said first and second pluralities of layers being formed of material commonly used for multilayer printed circuit board construction which includes a resin compound.

4. The capacitor assembly of claim 3, wherein said material of said first and second pluralities of layers includes fiberglass impregnated resin compound.

* * * * *